US012683474B2

(12) United States Patent
Ma et al.

(10) Patent No.: US 12,683,474 B2
(45) Date of Patent: Jul. 14, 2026

(54) MULTI-DIRECTIONAL VIBRATION MOTOR WITH PERIPHERAL MAGNETIC RING MADE FROM MAGNETS SURROUNDING COIL UNIT

(71) Applicant: AAC Technologies (Nanjing) Co., Ltd., Nanjing (CN)

(72) Inventors: Jie Ma, Nanjing (CN); Lubin Mao, Nanjing (CN); Yun Tang, Nanjing (CN); Ziang Li, Nanjing (CN); Wei Song, Nanjing (CN)

(73) Assignee: AAG Technologies (Nanjing) Co., Ltd., Nanjing (CN)

( * ) Notice: Subject to any disclaimer, the term of this patent is extended or adjusted under 35 U.S.C. 154(b) by 444 days.

(21) Appl. No.: 18/325,938

(22) Filed: May 30, 2023

(65) Prior Publication Data

US 2024/0204640 A1 Jun. 20, 2024

Related U.S. Application Data

(63) Continuation of application No. PCT/CN2022/144408, filed on Dec. 31, 2022.

(30) Foreign Application Priority Data

Dec. 19, 2022 (CN) .......................... 202211619627.6

(51) Int. Cl.
*H02K 33/18* (2006.01)
*H02K 33/12* (2006.01)
(52) U.S. Cl.
CPC ............. *H02K 33/18* (2013.01); *H02K 33/12* (2013.01); *H02K 2201/18* (2013.01)

(58) Field of Classification Search
CPC ........ H02K 35/00; H02K 35/02; H02K 33/12; H02K 33/18; H02K 33/00; H02K 33/02; H02K 33/04; H02K 33/06; H02K 2201/18
USPC ........................................ 310/15–37, 40 MM
See application file for complete search history.

(56) References Cited

U.S. PATENT DOCUMENTS

| | | | | |
|---|---|---|---|---|
| 3,279,690 A | * | 10/1966 | Masterson | G06K 1/02 234/119 |
| 8,278,786 B2 | * | 10/2012 | Woo | H02K 33/16 310/15 |
| 8,288,898 B2 | * | 10/2012 | Jun | H02K 33/16 310/34 |
| 10,110,106 B2 | * | 10/2018 | Xu | H02K 33/00 |
| 10,291,107 B2 | * | 5/2019 | Furukawa | H02N 2/188 |

(Continued)

*Primary Examiner* — Maged M Almawri
(74) *Attorney, Agent, or Firm* — Wiersch Law Group

(57) ABSTRACT

A multi-directional vibration motor, including a housing, a vibration unit, a coil unit, and a peripheral magnetic ring. The vibration unit includes a magnet unit in a cylinder shape and magnetized along a first direction. The coil unit is opposite to the magnet unit. The peripheral magnetic ring surrounds and is spaced apart from the coil unit. A magnetic pole at an inner side of the peripheral magnetic ring is the same as a magnetic pole at a side of the magnet unit adjacent thereto. The peripheral magnetic ring is formed by magnets that are symmetrical in pairs. The peripheral magnetic ring includes two first magnetic ring portions at two opposite sides of the coil unit along a second direction and two second magnetic ring portions at two opposite sides of the coil unit along a third direction. The motor realizes multi-directional vibration and has a small size.

10 Claims, 9 Drawing Sheets

(56) References Cited

U.S. PATENT DOCUMENTS

| | | | | |
|---|---|---|---|---|
| 10,637,339 B2* | 4/2020 | Liu | H02K 1/34 | |
| 10,848,044 B1* | 11/2020 | Miesner | H02K 33/06 | |
| 10,886,827 B2* | 1/2021 | Liu | H02K 33/14 | |
| 10,931,185 B2* | 2/2021 | Tang | H02K 33/12 | |
| 10,978,941 B2* | 4/2021 | Tang | H02K 33/12 | |
| 11,404,948 B2* | 8/2022 | Liu | H02K 33/16 | |
| 11,949,307 B2* | 4/2024 | Li | H02K 33/02 | |
| 2003/0034697 A1* | 2/2003 | Goldner | F16F 15/03 | |
| | | | 310/15 | |
| 2008/0265692 A1* | 10/2008 | Roberts | H02K 1/34 | |
| | | | 310/15 | |
| 2011/0006618 A1* | 1/2011 | Lee | H02K 33/16 | |
| | | | 310/25 | |
| 2011/0266892 A1* | 11/2011 | Wauke | H02K 33/18 | |
| | | | 310/25 | |
| 2013/0119785 A1* | 5/2013 | Han | G02B 27/646 | |
| | | | 310/12.16 | |
| 2015/0340939 A1* | 11/2015 | Kelp | H01F 7/122 | |
| | | | 310/12.26 | |
| 2016/0013710 A1* | 1/2016 | Dong | H02K 33/16 | |
| | | | 310/25 | |
| 2016/0164390 A1* | 6/2016 | Furukawa | H02N 2/185 | |
| | | | 310/25 | |
| 2016/0254736 A1* | 9/2016 | Jin | H02K 33/16 | |
| | | | 310/25 | |
| 2017/0012513 A1* | 1/2017 | Xu | H02K 41/0356 | |
| 2017/0033657 A1* | 2/2017 | Mao | H02K 33/16 | |
| 2017/0097492 A1* | 4/2017 | Hu | G02B 7/04 | |
| 2018/0021812 A1* | 1/2018 | Akanuma | H02K 33/00 | |
| | | | 310/25 | |
| 2018/0234771 A1* | 8/2018 | Hsieh | H02K 33/12 | |
| 2018/0297075 A1* | 10/2018 | Ling | B06B 1/045 | |
| 2018/0297076 A1* | 10/2018 | Xu | B06B 1/045 | |
| 2018/0351442 A1* | 12/2018 | Liu | H02K 33/16 | |
| 2019/0036435 A1* | 1/2019 | Zhu | H02K 33/02 | |
| 2019/0252962 A1* | 8/2019 | Ling | H02K 35/02 | |
| 2019/0356208 A1* | 11/2019 | Okayasu | B06B 1/045 | |
| 2020/0044538 A1* | 2/2020 | Tang | H02K 33/18 | |
| 2020/0044543 A1* | 2/2020 | Tang | H02K 33/18 | |
| 2020/0195115 A1* | 6/2020 | Zhang | H02K 33/16 | |
| 2020/0212779 A1* | 7/2020 | Tang | H02K 33/16 | |
| 2020/0212780 A1* | 7/2020 | Tang | H02K 33/18 | |
| 2021/0211030 A1* | 7/2021 | Li | H02K 33/18 | |
| 2021/0303073 A1* | 9/2021 | Hori | G06F 3/016 | |
| 2022/0311319 A1* | 9/2022 | Cui | H02K 33/16 | |
| 2022/0320984 A1* | 10/2022 | Li | H02K 33/02 | |
| 2022/0360156 A1* | 11/2022 | Li | H02K 33/10 | |
| 2023/0378862 A1* | 11/2023 | Mao | H02K 33/16 | |
| 2024/0186876 A1* | 6/2024 | Zhu | H02K 33/02 | |

* cited by examiner

MULTI-DIRECTIONAL VIBRATION MOTOR WITH PERIPHERAL MAGNETIC RING MADE FROM MAGNETS SURROUNDING COIL UNIT

TECHNICAL FIELD

The present disclosure relates to a motor, and in particular, to a multi-directional vibration motor applied to the field of mobile electronic products.

BACKGROUND

With the development of electronic technologies, portable consumer electronic products are becoming more and more popular, such as mobile phones, handheld game consoles, navigation apparatuses, or handheld multimedia entertainment devices. In these electronic products, vibration motors may generally be used for system feedback, such as mobile phone call prompts, information prompts, navigation prompts, and vibration feedback of game consoles. Such a wide range of applications requires excellent performance and a long service life of the vibration motors.

A vibration motor in the related art includes a base having a receiving space, a vibration unit, an elastic assembly fixed to the base and suspending the vibration unit in the receiving space, and a coil unit fixed to the base to drive the vibration unit to vibrate. An electric field generated by the coil unit interacts with a magnetic field generated by the vibration unit, to drive the vibration unit to perform reciprocating linear motion to generate vibration.

However, in the vibration motor in the related art, due to damping of the vibration unit during the vibration of the vibration unit, stability of the vibration unit is affected. In the related art, the damping of the vibration unit is adjusted by adding magnetic fluid or damping foam, but an overall size of the vibration motor is large due to a large size of the magnetic fluid or foam. In addition, the use of the elastic assembly in the vibration motor in the related art also makes the overall size of the vibration motor large. In order to realize vibration in multiple directions, the vibration unit and the coil unit of the vibration motor in the related art are separately arranged, and a vibration unit and a corresponding coil unit are arranged in each direction, which also makes the overall size of the vibration motor large.

Therefore, there is a need to provide a new vibration motor to solve the above problems.

SUMMARY

In an aspect, the present disclosure provides a multi-directional vibration motor, including a housing having a receiving space, a vibration unit received in the receiving space, a coil unit fixed to the housing to drive the vibration unit to vibrate, and a peripheral magnetic ring fixed to the housing and in a shape of a ring. The vibration unit includes a magnet unit interacting with the coil unit to provide a driving force, the magnet unit is in a shape of a cylinder, and the magnet unit is magnetized along a first direction parallel to an axial direction of the magnet unit. The coil unit is located in the housing and is arranged directly opposite to the magnet unit. The peripheral magnetic ring surrounds the coil unit and is spaced apart from the coil unit, a magnetic pole at an inner side of the peripheral magnetic ring is the same as a magnetic pole at a side of the magnet unit adjacent thereto, so as to generate a damping force that hinders motion of the vibration unit. The peripheral magnetic ring is formed by magnets that are symmetrical in pairs, the peripheral magnetic ring includes two first magnetic ring portions respectively arranged at two opposite sides of the coil unit along a second direction and two second magnetic ring portions respectively arranged at two opposite sides of the coil unit along a third direction, and both the second direction and the third direction are distributed in a same plane and perpendicular to the first direction.

As an improvement, the magnet unit includes a central magnet and a central magnetic ring interacting with the coil unit to provide the driving force, the central magnet is in a shape of a cylinder, the central magnetic ring is in a shape of a ring and arranged around the central magnet; both the central magnet and the central magnetic ring are magnetized along the first direction, and a magnetic pole at one end of the central magnet is opposite to a magnetic pole at one end of the central magnetic ring adjacent thereto.

As an improvement, the vibration unit further includes a weight in a shape of a ring, and the weight surrounds an outer side of the central magnetic ring and is fixedly connected to the central magnetic ring.

As an improvement, a magnetization direction of the peripheral magnetic ring includes any one of radial magnetization, axial magnetization, or unidirectional magnetization. The unidirectional magnetization refers to the first magnetic ring portions being magnetized along the second direction and the second magnetic ring portions being magnetized along the third direction.

As an improvement, the second direction and the third direction are perpendicular to each other.

As an improvement, the housing includes a lower cover plate, a side wall bending and extending from a periphery of the lower cover plate, and an upper cover plate covering the side wall and arranged opposite to the lower cover plate. The lower cover plate, the side wall, and the upper cover plate jointly define the receiving space. The coil unit includes at least one first coil and at least one second coil that are received in the receiving space, the at least one first coil is fixed to the lower cover plate, the at least one second coil is fixed to the upper cover plate; an angle is formed between an arrangement direction of the at least one first coil and an arrangement direction of the at least one second coil.

As an improvement, the at least one first coil includes two first coils, and the at least one second coil includes two second coils. The two first coils are energized with currents in opposite directions, the two second coils are energized with currents in opposite directions, and each of the two first coils and the two second coils is in a shape of a racetrack or a semicircle.

As an improvement, each of the lower cover plate and the upper cover plate is made of a magnetically conductive material.

As an improvement, the multi-directional vibration motor further includes a sliding plate fixed to the housing and located between the peripheral magnetic ring and the coil unit. The vibration unit further includes two flat plates respectively arranged at two opposite sides of the magnet unit along the first direction. One side of the sliding plate close to one of the two flat plates, one side of the peripheral magnetic ring close to one of the two flat plates, and one side of the coil unit close to one of the flat plates are aligned with each other and spaced apart from one of the flat plates to form gaps.

As an improvement, each of the two flat plate is made of a non-magnetically-conductive material, and the sliding plate is made of a self-lubricating material.

DESCRIPTION OF EMBODIMENTS

Figure 1:
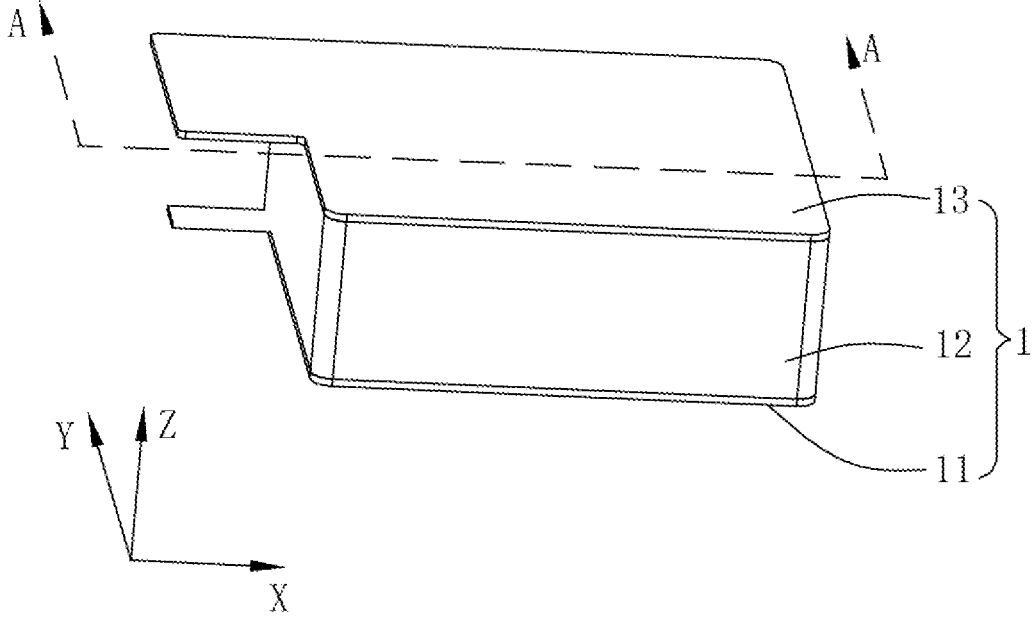
FIG. 1 is a schematic diagram of a three-dimensional structure of a multi-directional vibration motor according to the present disclosure.
Figure 2:
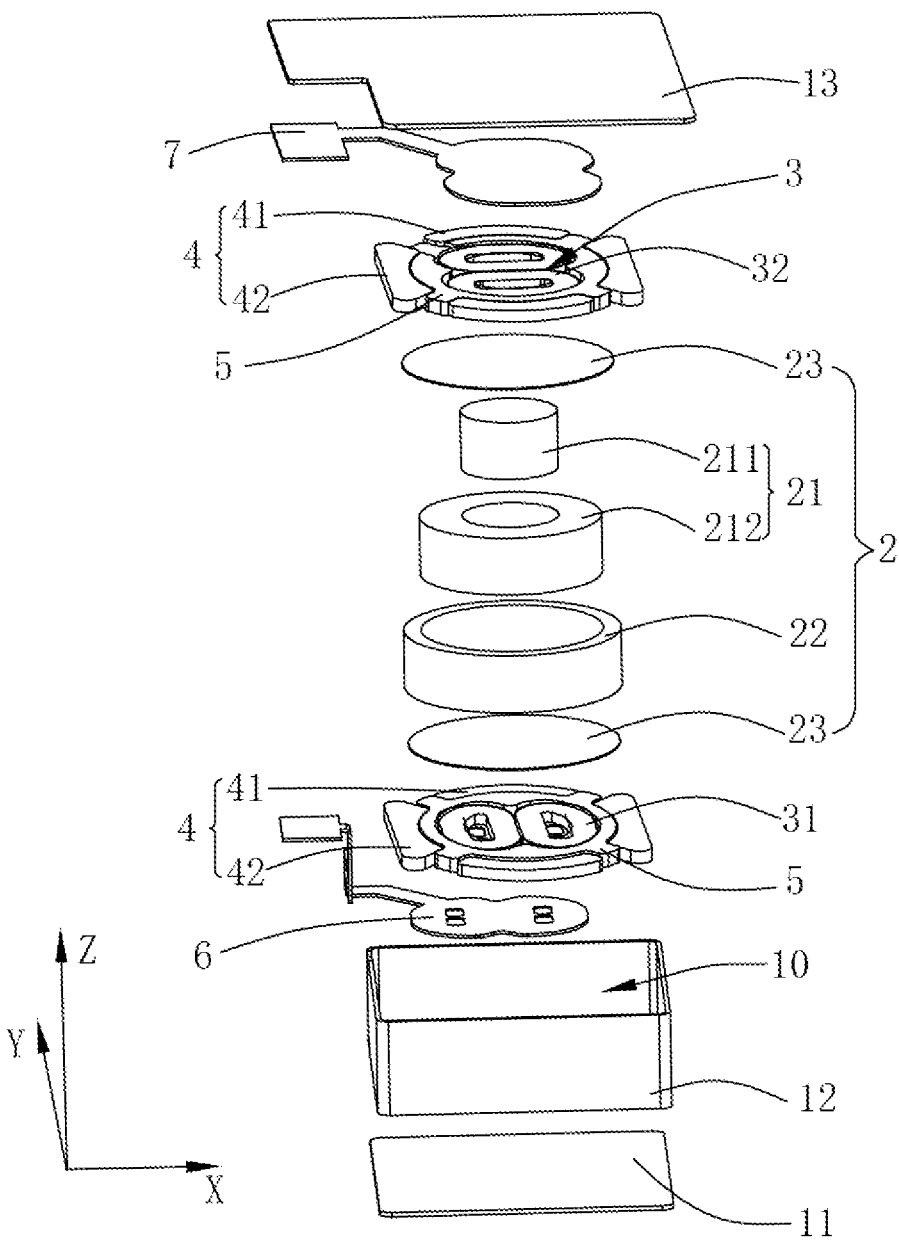
FIG. 2 is a schematic exploded view of a partial three-dimensional structure of the multi-directional vibration motor according to the present disclosure.
Figure 3:
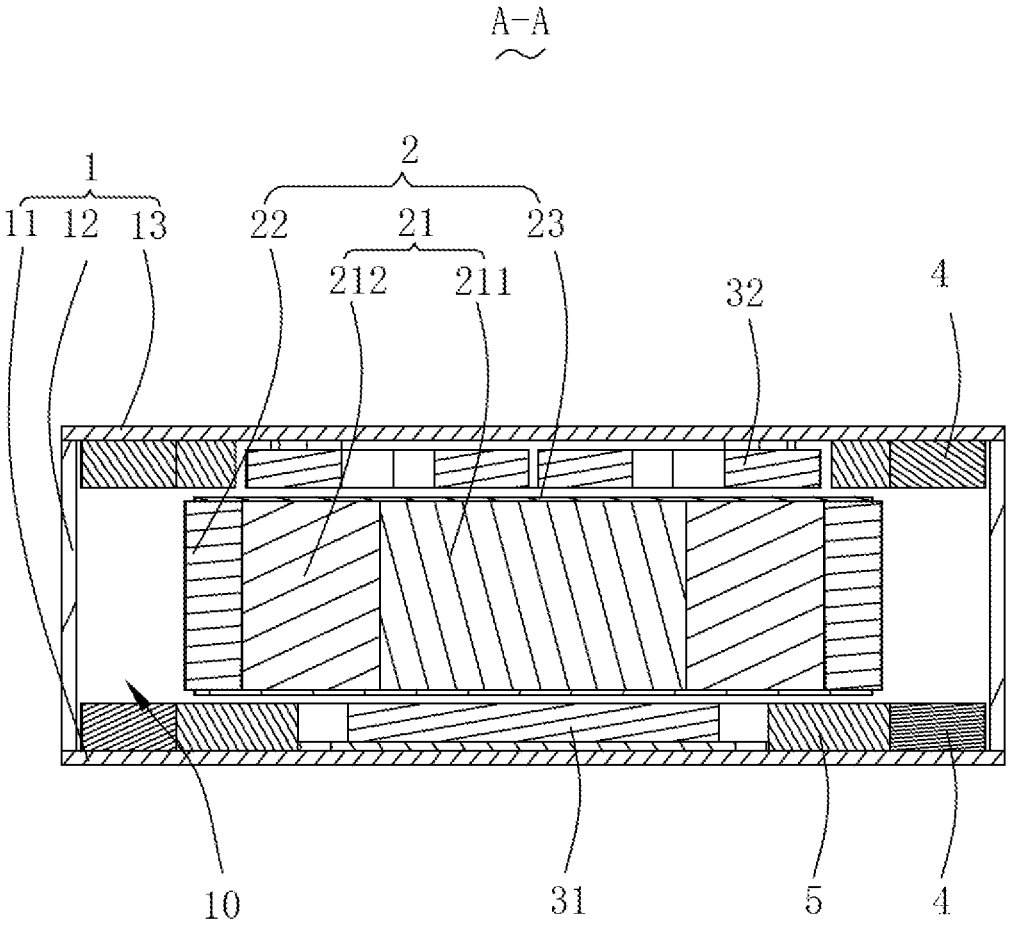
FIG. 3 is a sectional view taken along A-A in FIG. 1.

The present disclosure is further described below with reference to the accompanying drawings and embodiments.

The present disclosure provides a multi-directional vibration motor 100.

Referring to FIG. 1 to FIG. 7, the multi-directional vibration motor 100 includes a housing 1, a vibration unit 2, a coil unit 3, a peripheral magnetic ring 4, a sliding plate 5, a first electric-conductive member 6, and a second electric-conductive member 7.

The housing 1 has a receiving space 10.

In an example, the housing 1 includes a lower cover plate 11, a side wall 12 bending and extending from a periphery of the lower cover plate 11, and an upper cover plate 13 covering the side wall 12 and arranged opposite to the lower cover plate 11. The lower cover plate 11, the side wall 12, and the upper cover plate 13 jointly define the receiving space 10. Certainly, it is not limited thereto. The lower cover plate 11 and the side wall 12 may also be integrally formed.

In this embodiment, both the lower cover plate 11 and the upper cover plate 13 are made of a magnetically conductive material. When the lower cover plate 11 and the upper cover plate 13 are magnetically conductive, it is more favorable for a magnetic line of force to form a circuit, which enhances a driving force and effectively reduces overall flux leakage of the multi-directional vibration motor 100.

The vibration unit 2 is received in the receiving space 10.

In an example, the vibration unit 2 includes a magnet unit 21, a weight 22, and a flat plate 23.

The magnet unit 21 interacts with the coil unit 3 to provide a driving force.

The magnet unit 21 is in a shape of a cylinder. The magnet unit 21 is magnetized along a first direction Z parallel to an axial direction thereof. In this embodiment, the first direction Z is a direction of a thickness of the multi-directional vibration motor 100.

In an example, the magnet unit 21 includes a central magnet 211 and a central magnetic ring 212 interacting with the coil unit 3 to provide the driving force.

The central magnet 211 is in a shape of a cylinder.

The central magnetic ring 212 is in a shape of a ring and arranged around the central magnet 211. In this embodiment, the central magnetic ring 212 is a circular ring.

Both the central magnet 211 and the central magnetic ring 212 are magnetized along the first direction Z.

A magnetic pole at one end of the central magnet 211 is opposite to that at one end of the central magnetic ring 212 adjacent thereto. Such a structure enables the magnetic line of force to pass through the coil unit 3 to form a magnetic circuit.

The weight 22 is in a shape of a ring. The weight 22 surrounds an outer side of the central magnetic ring 212 and is fixedly connected to the central magnetic ring 212. The weight 22 is configured for counterweight.

Two flat plates 23 are provided. The two flat plates 23 are respectively arranged at two opposite sides of the magnet unit 21 along the first direction Z. The two flat plates 23 are configured to cause the central magnet 211, the central magnetic ring 212, and the weight 22 to form an entirety in the first direction Z, which facilitates the vibration unit 2 to form an entirety and serve as a mover of the multi-directional vibration motor 100, so that the vibration unit 2 is easy to vibrate in the receiving space 10.

In this embodiment, the flat plate 23 is made of a non-magnetically-conductive material. The flat plate 23 made of the non-magnetically-conductive material can reduce a thickness, which can effectively ensure flatness of a friction surface and reduce a friction coefficient, thereby being conducive to miniaturization of the multi-directional vibration motor 100 and improvement of the vibration performance.

The coil unit 3 is fixed to the housing 1 to drive the vibration unit 2 to vibrate.

The coil unit 3 is located in the housing 1 and is arranged directly opposite to the magnet unit 21. In this embodiment, the coil unit 3 is located at a central position of the housing 1.

In an example, the coil unit 3 includes a first coil 31 and a second coil 32 that are received in the receiving space 10.

The first coil 31 is fixed to the lower cover plate 11. The first coil 31 extends along a second direction X or extends along a third direction Y. The extension is arranged to be in a direction in which most of a current of the first coil 31 flows, that is, a current direction.

Both the second direction X and the third direction Y are distributed in a same plane and perpendicular to the first direction Z. In this embodiment, the second direction X and the third direction Y are perpendicular to each other.

Two first coils 31 are provided. The two first coils 31 are energized with currents in opposite directions.

The second coil 32 is fixed to the upper cover plate 13. The second coil 32 extends along the third direction Y or extends along the second direction X. The extension is arranged to be in a direction in which most of a current of the second coil 32 flows, that is, a current direction. In this way, an angle is formed between an arrangement direction of the first coil 31 and an arrangement direction of the second coil 32. In this embodiment, the arrangement directions are the current directions. That is, an angle is formed between a direction of extension of the first coil 31 and a direction of extension of the second coil 32.

Figure 6:
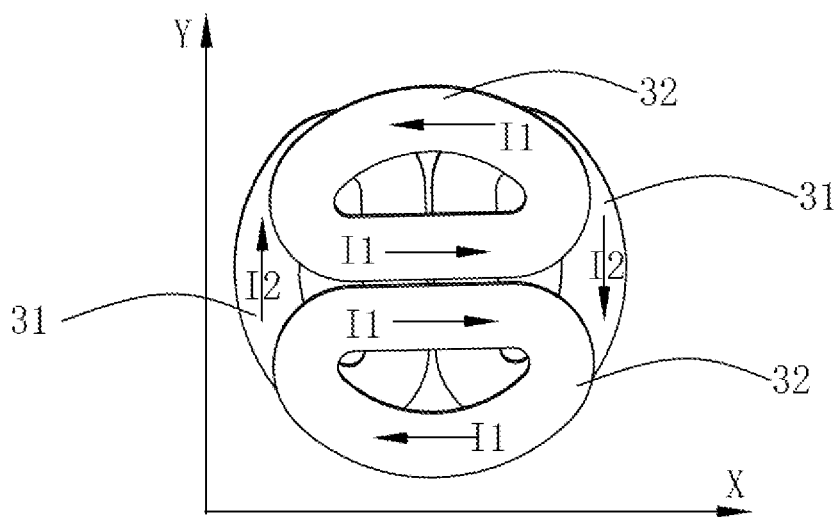
FIG. 6 is a schematic structural diagram of a coil unit in the multi-directional vibration motor according to the present disclosure.
Figure 7:
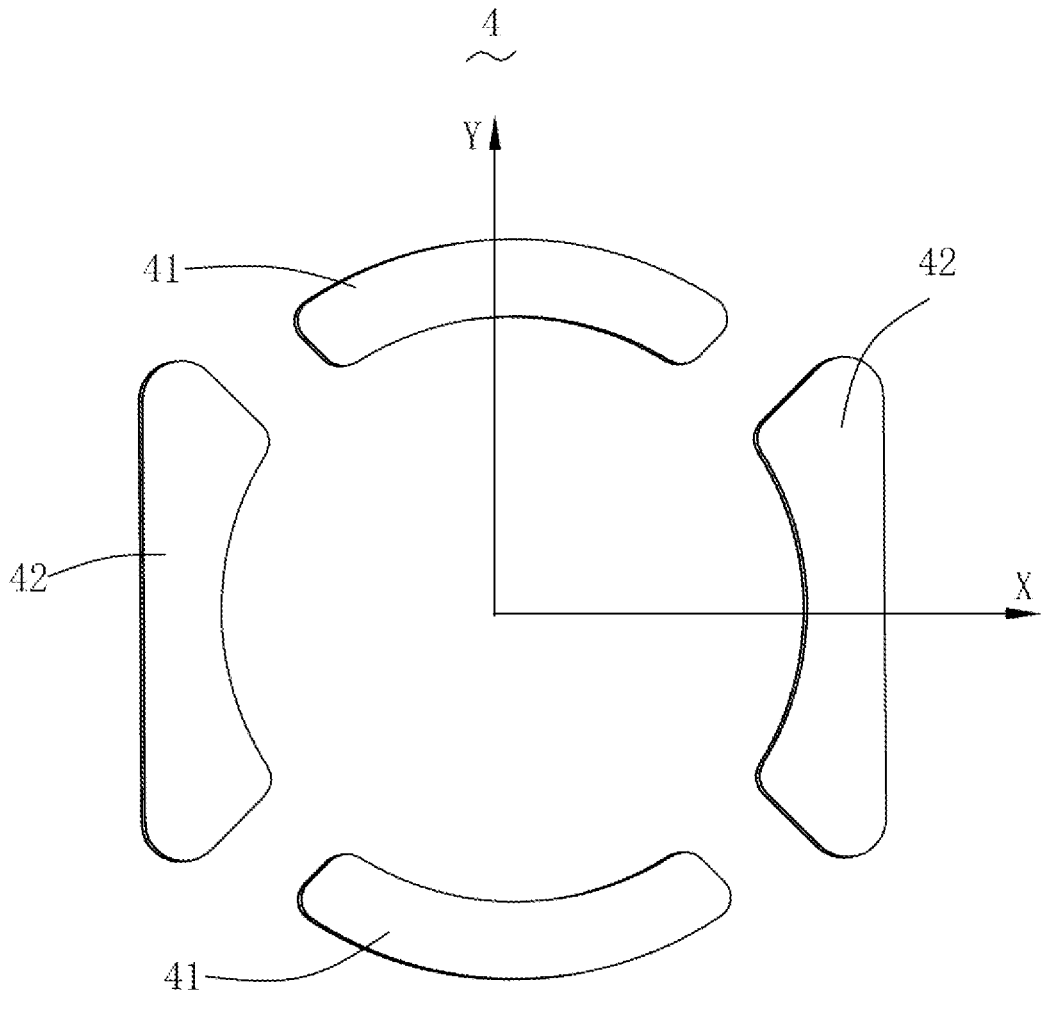
FIG. 7 is a schematic structural diagram of a peripheral magnetic ring in the multi-directional vibration motor according to the present disclosure.

Two second coils 32 are provided. The two second coils 32 are energized with currents in opposite directions. Referring to FIG. 6, a direction of a current I2 in the first coil 31 is the third direction Y, and a direction of a current I1 in the second coil 32 is the second direction X. When the coil unit 3 is energized, a driving force perpendicular to the current direction is formed. For example, the first coil 31 forms a driving force in the third direction Y, and the second coil 32 forms a driving force in the second direction X.

Each of the first coil 31 and the second coil 32 is in a shape of a racetrack or a semicircle. In this embodiment, each of the first coil 31 and the second coil 32 is in a shape of a semicircle. The first coil 31 and the second coil 32 in the shape of the semicircle can increase a proportion of effective sections, and a utilization rate with a same size is about 10% higher than that of the first coil 31 and the second coil 32 in the shape of the racetrack.

The peripheral magnetic ring 4 is fixed to the housing 1.

The peripheral magnetic ring 4 is in a shape of a ring. The peripheral magnetic ring 4 surrounds the coil unit 3 and is arranged apart from the coil unit 3.

A magnetic pole at an inner side of the peripheral magnetic ring 4 is the same as that at one side of the magnet unit 21 adjacent thereto, so as to generate a damping force that hinders motion of the vibration unit 2.

The peripheral magnetic ring 4 provides a repulsive force for the central magnetic ring 212 in the magnet unit 21, forming recovery stiffness in the second direction X and the third direction Y. When the central magnetic ring 212 is not externally driven, the central magnetic ring 212 is automatically returned to a center point of the multi-directional vibration motor 100 under the repulsive force. During actual assembly, the central magnetic ring 212 may be unbalanced by the repulsive force of the peripheral magnetic ring 4, forming a torque and thus rotating. Therefore, the central magnetic ring 212 is a circular ring, which prevents an adverse effect caused by rotation.

The peripheral magnetic ring 4 is formed magnets that are symmetrical in pairs. Such a structure is conducive to magnetization and assembly of the magnets.

In an example, the peripheral magnetic ring 4 includes two first magnetic ring portions 41 respectively arranged at two opposite sides of the coil unit 3 along the second direction X and two second magnetic ring portions 42 respectively arranged at two opposite sides of the coil unit 3 along the third direction Y.

The two first magnetic ring portions 41 are in a same shape. The two second magnetic ring portions 42 are in a same shape. The shape of the first magnetic ring portions 41 and the shape of the second magnetic ring portions 42 may be the same or different. In a case that the shape of the first magnetic ring portions 41 and the shape of the second magnetic ring portions 42 are the same, stiffness of the multi-directional vibration motor 100 in the second direction X is the same as that in the third direction Y. In this case, the multi-directional vibration motor 100 has a same frequency in the two directions, and is a single-frequency bi-directional motor. In a case that the shape of the first magnetic ring portions 41 and the shape of the second magnetic ring portions 42 are different, the stiffness of the multi-directional vibration motor 100 in the second direction X is different from that in the third direction Y. In this case, the multi-directional vibration motor 100 has different frequencies in the two directions, and is a dual-frequency bi-directional motor. A specific actual selection may be considered according to design requirements. Details are not described herein.

Figure 4:
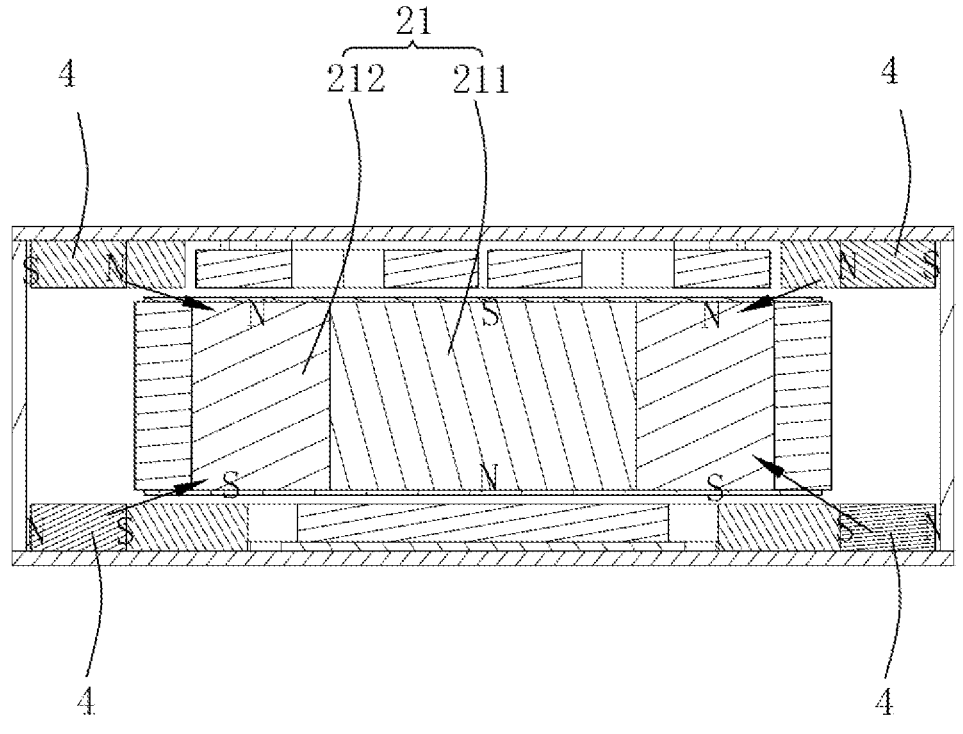
FIG. 4 is a schematic diagram of distribution of magnetic poles of the multi-directional vibration motor according to the present disclosure.
Figure 5:
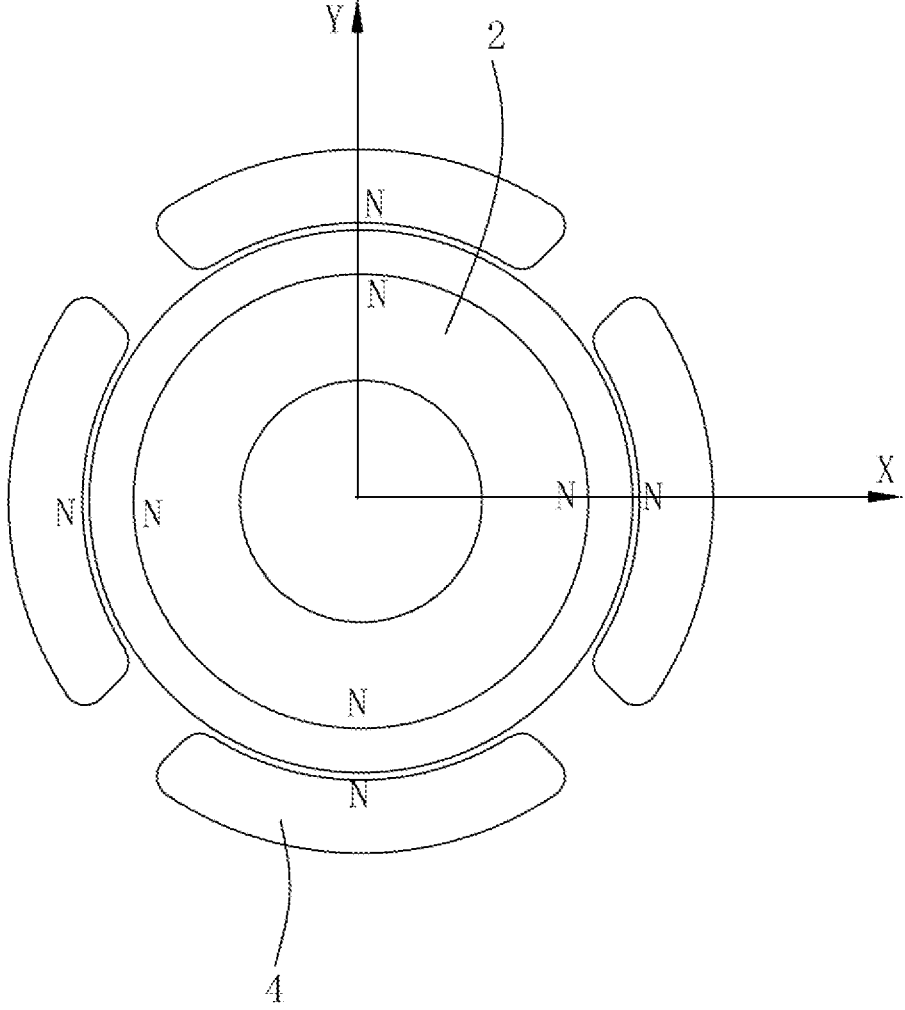
FIG. 5 is a schematic diagram of distribution of magnetic poles of the multi-directional vibration motor according to the present disclosure at another angle.

A magnetization direction of the peripheral magnetic ring 4 includes any one of radial magnetization, axial magnetization, and unidirectional magnetization In this embodiment, the magnetization direction of the peripheral magnetic ring 4 is radial magnetization. Referring to FIG. 4 to FIG. 5 together, taking magnetic poles at a side close to the upper cover plate 13 as an example, a magnetic pole at one end of the central magnet 211 is an N pole, and a magnetic pole at one end of the central magnetic ring 212 is an S pole. That is, a magnetic pole at one end of the central magnet 211 is opposite to that at one end of the central magnetic ring 212 adjacent thereto. A magnetic pole at an inner side of the peripheral magnetic ring 4 is an N pole. That is, the magnetic pole at the inner side of the peripheral magnetic ring 4 is the same as that at one side of the magnet unit 21 adjacent thereto.

In this embodiment, for a conventional magnetic-spring motor, magnetic flux leakage is serious when a housing of the motor is made of non-magnetically-conductive material. When a magnetically conductive material is used, a magnet of a vibrator and the housing form a large suction force, which may cause the vibrator to be firmly sucked and cannot be driven. For the multi-directional vibration motor 100 of the present disclosure, the peripheral magnetic ring 4 and the central magnetic ring 212 form a repulsive force, and when the vibrator is attracted to the side wall 12 at a side, the corresponding repulsive force increases synchronously, which can effectively reduce the problem of firm suction of the vibrator. In terms of design, after reasonable parameter design, the repulsive force on the vibrator can be balanced with the suction force of the lower cover plate 11 and the upper cover plate 13, thereby completely solving the problem of firm suction.

Figure 8:
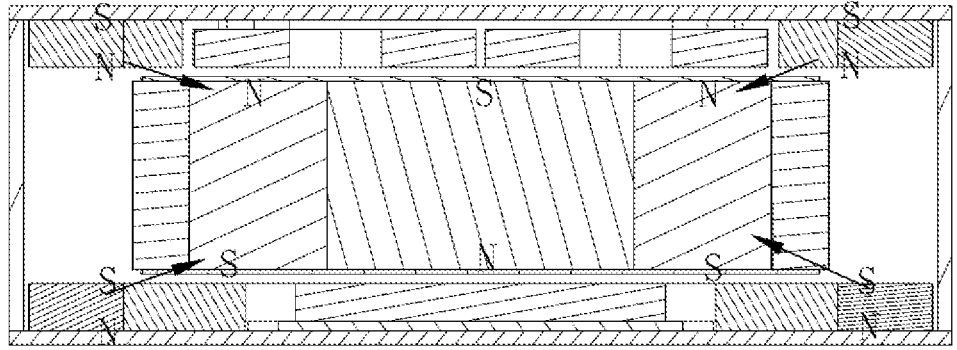
FIG. 8 is a schematic diagram of distribution of the magnetic poles of the multi-directional vibration motor according to another embodiment of the present disclosure.

FIG. 8 is a schematic diagram of distribution of the magnetic poles of the multi-directional vibration motor according to another embodiment of the present disclosure. Referring to FIG. 8, in another embodiment, the magnetization direction of the peripheral magnetic ring 4 is the axial magnetization. A difference from this embodiment lies in the magnetization direction of the peripheral magnetic ring.

Figure 9:
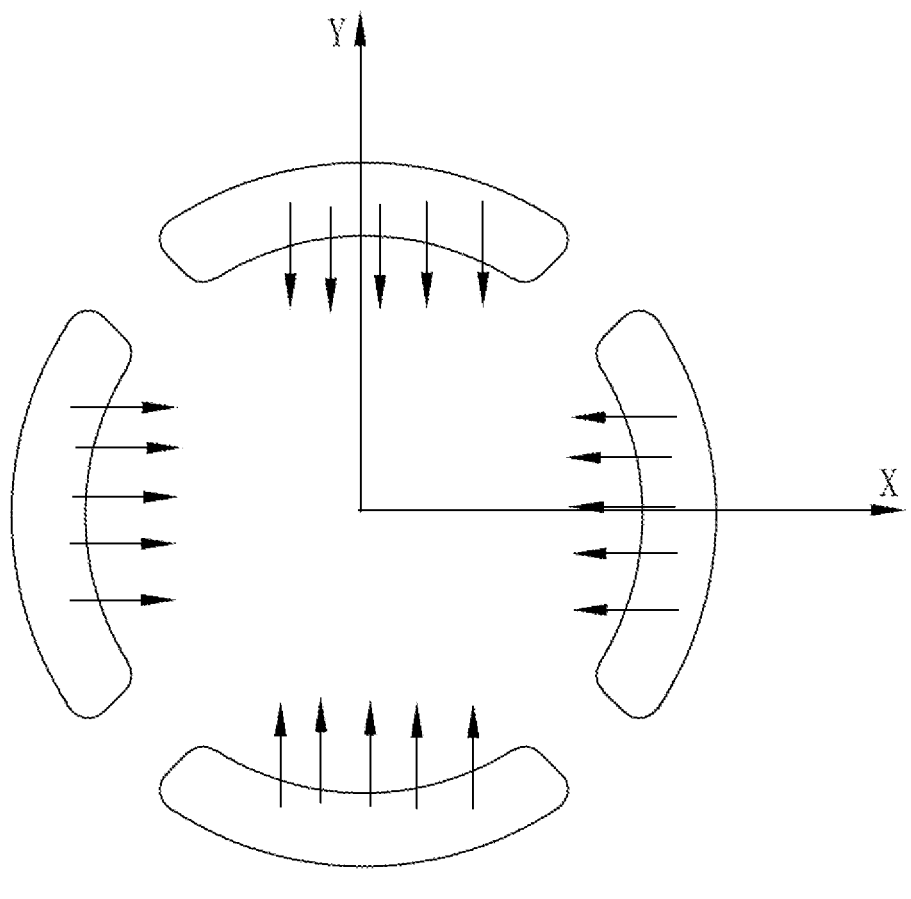
FIG. 9 is a schematic diagram of distribution of the magnetic poles of the multi-directional vibration motor according to yet another embodiment of the present disclosure.

FIG. 9 is a schematic diagram of distribution of the magnetic poles of the multi-directional vibration motor according to yet another embodiment of the present disclosure. Referring to FIG. 9, in yet another embodiment, the magnetization direction of the peripheral magnetic ring 4 is the unidirectional magnetization. In an example, the unidirectional magnetization refers to the first magnetic ring portions 41 being magnetized along the second direction X and the second magnetic ring portions 42 being magnetized along the third direction Y. The use of the unidirectional magnetization is low in cost and prone to magnetization.

The sliding plate 5 is fixed to the housing 1. The sliding plate 5 is located between the peripheral magnetic ring 4 and the coil unit 3.

In this embodiment, a side of the sliding plate 5 close to the flat plate 23, a side of the peripheral magnetic ring 4 close to the flat plate 23, and a side of the coil unit 3 close to the flat plate 23 are aligned with each other and spaced apart from the flat plate 23 to form gaps. Such a structure helps to prevent friction and wear between the sliding plate 5 and the flat plate 23, thereby improving the vibration performance of the multi-directional vibration motor 100 of the present disclosure.

The sliding plate 5 is made of a self-lubricating material. In this embodiment, the sliding plate 5 is made of a polytetrafluoroethylene composite material.

The first electric-conductive member 6 is electrically connected to the first coil 31, and the first electric-conductive member 6 is configured to provide a control current for the first coil 31.

The second electric-conductive member 7 is electrically connected to the second coil 32, and the first electric-conductive member 6 is configured to provide a control current for the second coil 32.

Compared with the related art, in the multi-directional vibration motor of the present disclosure, the housing is provided with the magnet unit in a shape of a cylinder and the coil unit arranged directly opposite to the magnet unit, and the magnet unit is magnetized along the first direction parallel to the axial direction thereof. The vibration unit having the magnet unit serves as a mover of the multi-directional vibration motor of the present disclosure, and the coil unit is fixed to a central position of the housing to serve as a stator of the multi-directional vibration motor of the present disclosure. Then, the housing is provided with the peripheral magnetic ring in a shape of a ring, the peripheral magnetic ring surrounds the coil unit and is arranged apart from the coil unit, and a magnetic pole at an inner side of the peripheral magnetic ring is arranged to be the same as that at one side of the magnet unit adjacent thereto, so as to generate a damping force that hinders motion of the vibration unit, that is, a repulsive force that generates a magnetic field. The peripheral magnetic ring serves as a magnetic spring of the multi-directional vibration motor of the present disclosure. The structure is simple, and a space in the housing can be used to mount the stator, the mover, and the magnetic spring, so that the multi-directional vibration motor of the present disclosure has a small size. The peripheral magnetic ring is formed by magnets that are symmetrical in pairs. In an example, two first magnetic ring portions and two second magnetic ring portions are provided, the two first magnetic ring portions are respectively arranged at two opposite sides of the coil unit along a second direction, and the two second magnetic ring portions are respectively arranged at two opposite sides of the coil unit along a third direction. Both the second direction and the third direction are distributed in a same plane and perpendicular to the first direction. According to the structure, the coil unit drives the first magnetic ring portions to cause the vibration unit to vibrate only along the second direction, or the coil unit drives the second magnetic ring portions to cause the vibration unit to vibrate only along the third direction, or the coil unit drives the first magnetic ring portions and the second magnetic ring portions at the same time to cause the vibration unit to vibrate in a resultant force direction between the second direction and the third direction, so that the multi-directional vibration motor of the present disclosure realizes multi-directional vibration.

The above are merely implementations of the present disclosure and not thus intended to limit the patent scope of the present disclosure. All equivalent structures or equivalent flow transformations made by virtue of contents of the specification and the drawings of the present disclosure or direct or indirect application of the contents to the other related technical fields shall fall within the patent protection scope of the present disclosure.

What is claimed is:

1. A multi-directional vibration motor, comprising a housing having a receiving space, a vibration unit received in the receiving space, a coil unit fixed to the housing to drive the vibration unit to vibrate, and a peripheral magnetic ring fixed to the housing and in a shape of a ring, wherein the vibration unit comprises a magnet unit interacting with the coil unit to provide a driving force, the magnet unit is in a shape of a cylinder, and the magnet unit is magnetized along a first direction parallel to an axial direction of the magnet unit;

wherein the coil unit is located in the housing and is arranged directly opposite to the magnet unit;

wherein the peripheral magnetic ring surrounds the coil unit and is spaced apart from the coil unit, a magnetic pole at an inner side of the peripheral magnetic ring is the same as a magnetic pole at a side of the magnet unit adjacent thereto, so as to generate a damping force that hinders motion of the vibration unit; and wherein the peripheral magnetic ring is formed by magnets that are symmetrical in pairs, the peripheral magnetic ring comprises two first magnetic ring portions respectively arranged at two opposite sides of the coil unit along a second direction and two second magnetic ring portions respectively arranged at two opposite sides of the coil unit along a third direction, and both the second direction and the third direction are distributed in a same plane and perpendicular to the first direction.

2. The multi-directional vibration motor as described in claim 1, wherein a magnetization direction of the peripheral magnetic ring comprises any one of radial magnetization, axial magnetization, or unidirectional magnetization, wherein the unidirectional magnetization refers to the first magnetic ring portions being magnetized along the second direction and the second magnetic ring portions being magnetized along the third direction.

3. The multi-directional vibration motor as described in claim 1, wherein the second direction and the third direction are perpendicular to each other.

4. The multi-directional vibration motor as described in claim 1, wherein the magnet unit comprises a central magnet and a central magnetic ring interacting with the coil unit to provide the driving force, the central magnet is in a shape of a cylinder, the central magnetic ring is in a shape of a ring and arranged around the central magnet; both the central magnet and the central magnetic ring are magnetized along the first direction, and a magnetic pole at one end of the central magnet is opposite to a magnetic pole at one end of the central magnetic ring adjacent thereto.

5. The multi-directional vibration motor as described in claim 4, wherein the vibration unit further comprises a weight in a shape of a ring, and the weight surrounds an outer side of the central magnetic ring and is fixedly connected to the central magnetic ring.

6. The multi-directional vibration motor as described in claim 1, further comprising a sliding plate fixed to the housing and located between the peripheral magnetic ring and the coil unit, wherein the vibration unit further comprises two flat plates respectively arranged at two opposite sides of the magnet unit along the first direction, and wherein one side of the sliding plate close to one of the two flat plates, one side of the peripheral magnetic ring close to one of the two flat plates, and one side of the coil unit close to one of the flat plates are aligned with each other and spaced apart from one of the flat plates to form gaps.

7. The multi-directional vibration motor as described in claim 6, wherein each of the two flat plates is made of a non-magnetically-conductive material, and the sliding plate is made of a self-lubricating material.

8. The multi-directional vibration motor as described in claim 1, wherein the housing comprises a lower cover plate, a side wall bending and extending from a periphery of the lower cover plate, and an upper cover plate covering the side wall and arranged opposite to the lower cover plate, wherein the lower cover plate, the side wall, and the upper cover plate jointly define the receiving space; and wherein the coil unit comprises at least one first coil and at least one second coil that are received in the receiving space, the at least one first coil is fixed to the lower cover plate, the at least one second coil is fixed to the upper cover plate; an angle is formed between an arrangement direction of the at least one first coil and an arrangement direction of the at least one second coil.

9. The multi-directional vibration motor as described in claim 8, wherein the at least one first coil comprises two first coils, and the at least one second coil comprises two second coils, wherein the two first coils are energized with currents in opposite directions, the two second coils are energized with currents in opposite directions, and each of the two first coils and the two second coils is in a shape of a racetrack or a semicircle.

10. The multi-directional vibration motor as described in claim 8, wherein each of the lower cover plate and the upper cover plate is made of a magnetically conductive material.

* * * * *